United States Patent Office 3,345,308
Patented Oct. 3, 1967

3,345,308
POLYMERIZATION OF OLEFIN OXIDES
AND OLEFIN SULFIDES
Joginder Lal, Akron, Ohio, assignor to The Goodyear
Tire & Rubber Company, Akron, Ohio, a corporation
of Ohio
No Drawing. Filed Sept. 18, 1964, Ser. No. 397,624
21 Claims. (Cl. 260—2)

ABSTRACT OF THE DISCLOSURE

Metal alkyl xanthates, metal dialkyldithiocarbamates, metal thiocarboxylates, and compounds related to these structures are catalysts for the polymerization of olefin oxides and olefin sulfides. Zinc and cadmium are preferred metals. Vulcanizable copolymers of olefin oxides were also obtained. These catalysts are easy to handle.

This invention relates to a novel process for the polymerization of olefin oxides and olefin sulfides and to the novel catalyst employed.

Prologue

A variety of catalysts are known to be capable of polymerizing alkylene oxides to produce polymers. Examples of such known catalysts are metal halides, metal halide-alkylene oxide complexes, metal alkoxides and carbonates of the alkaline earth metals. More recently it has been disclosed that metal alkyl compounds in combination with water, organic alcohols or oxygen form suitable catalysts for polymerizing alkylene oxides. The utilization of organo-metallic compounds of this nature are not without drawbacks. Metal alkyls, in addition to being expensive, are potentially hazardous, especially when handled in large quantities, because of their toxic fumes and pyrophoric properties.

Accordingly, one object of the present invention is the disclosure of a new catalyst system for polymerizing epoxides and episulfides. Another object is the disclosure of an effective, but relatively inexpensive, catalyst. A further objective is the development of a catalyst system which is relatively safe for general industrial use. These and other objects will readily become apparent to those skilled in the art in the light of the teachings herein set forth.

Present invention

Applicant has now discovered a polymerization process which comprises reacting under suitable polymerization conditions a mixture of at least one monomer represented by the formula

wherein Q represents oxygen or sulfur; R' represents R or hydrogen; R represents a monovalent organic radical containing no element other than carbon, hydrogen, ether, oxygen and halogen and A catalyst represented by the formula

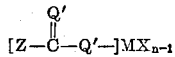

wherein Z represents R, OR, or NR'$_2$; R, R' and Q each has the meaning previously indicated; Q' represents sulfur or oxygen and at least one Q' in each molecule must be sulfur; M represents zinc, cadmium, aluminum or iron; $n$ represents the valence of M; N represents nitrogen; and X represents any monovalent radical selected from the group consisting of halide; hydroxyl, hydride, alkoxy, thioalkyl, hydrocarbon radical, and

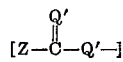

Monomer

In its broad scope, the subject invention reveals a novel catalyst and method for polymerizing compounds broadly characterized as epoxides and episulfides, and particularly those materials known as oxirane

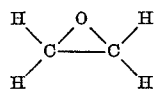

and thiirane

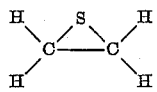

and the mono-, di-, tri-, and tetrasubstituted derivatives thereof, to form elastomeric polymers. Representative examples of radicals which may be substituents of oxirane and thiirane in the practice of this invention are: alkyl (especially alkyl having up to ten carbon atoms), alkenyl, cycloalkyl, aryl, aralkyl, alkoxyalkyl, alkenoxyalkyl, alkoxy and alkenoxy radicals.

Representative examples of derivatives of exoranes are: ethylene oxide, propylene oxide, 1-butene oxide, 2-butene oxide (cis or trans), 1-hexane oxide, 1-octane oxide, 2-octane oxide (cis or trans), 1-dodecene oxide, styrene oxide, 3-phenyl-1,2-epoxypropane (benzyl ethylene oxide), 3,3,3-trifluoro-1,2-epoxypropane, epichlorohydrin, epibromohydrin, epifluorohydrin, butadiene monoxide, isoprene monoxide, 1,2-epoxy-3-ethoxypropane, 1,2-epoxy-3-(β-chloroethoxy) propane, 1,2-epoxy-3-phenoxypropane, 1,2-epoxy-3-(p-chlorophenoxy) propane, 1,2-epoxy-3-allyloxypropane (allyl glycidyl ether), 4,5-epoxy-1-hexene, 1-phenyl-1,2-epoxypropane, isobutylene oxide, cyclohexene oxide, cyclooctene oxide (cis or trans), cyclododecene oxide, indene oxide, 1-vinyl-3,4-epoxycyclohexane, dicyclopentadiene monoxide, limonene monoxide, 1,2-diphenyl ethylene oxide, 2,3-epoxypentane, 1,1,2-trimethyl ethylene oxide, 2,4,4-trimethyl-2,3-epoxypentane, 2,4,4-trimethyl-1,2-epoxypentane, and 1,1,2,2-tetramethyl ethylene oxide.

Representative examples of substituted thiirane monomers suitable for use in practicing my invention are: ethylene sulfide, propylene sulfide, 1-butene sulfide, 2-butene sulfide (cis or trans), styrene sulfide, 1,2-epithio-3-chloropropane, butadiene monosulfide, 1-vinyl-3,4-epithiocyclohexane, isobutylene sulfide, 1,1,1-trimethyl ethylene sulfide, 1,1,2,2-tetramethyl ethylene sulfide, and 3,3,3-trifluoro-1,2-epithiopropane.

Catalyst

The novel catalysts employed in the practice of this invention are compounds with the general formula

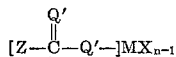

In this formula Z, Q', M, X and $n$ represents the elements or radicals previously indicated. Zinc is a preferred metal M.

The essential functional group of the novel catalyst of this invention is at least one group represented by the monovalent radical

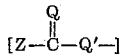

bonded to a metal represented by M. The nature of the remaining portion of the structure, represented by X supra and satisfying the unused valence(s) of M, is of relatively lesser importance and may be varied widely. Generally, however, X will consist of monovalent radicals bonded to the metal M, examples of which include halide, hydride, hydroxyl, alkoxy, thioalkyl, hydrocarbon radical, and

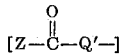

Within this definition, when X represents the radical

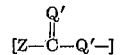

the catalyst compound would then be

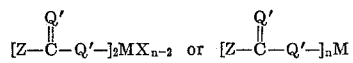

As previously indicated, Z represents a radical such as R, OR, SR, or $NR_2'$. R, in the above formula representing the catalyst compounds of this invention, may be an alkyl (including cycloalkyl), aryl, aralkyl, alkaryl, alkenyl, alkoxyalkyl, or aryloxyalkyl radical. The alkyl radicals may be straight chain or branched, long or short. R' represents hydrogen or R.

Thus, the catalysts of this invention encompass compounds in such chemical families as:

I. Tautomeric thiocarboxylates:

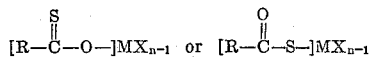

II. Dithiocarboxylate:

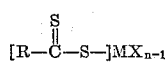

III. Tautomeric thiocarbonates:

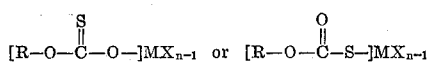

(also known as Bender's Salt)

IV. Tautomeric dithiocarbonates:

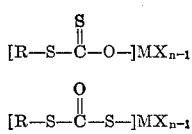

or

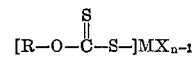

(commonly known as xanthate)

V. Trithiocarbonate:

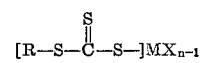

VI. Tautomeric thiocarbamates:

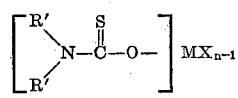

or

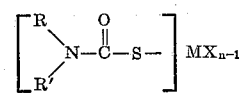

VII. Dithiocarbamate:

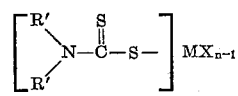

It will be obvious to those skilled in the art, that the many examples given, which are represented by Z, M, and X can be intermingled in many combination without departing from the spirit of the invention. Similarly, di- or trihydroxy compounds, di- or triamines, or di- or trithiocarboxylic acids can be used in preparing the above classes of catalysts.

Examples of the various compounds which belong to the above-mentioned families are: zinc thiobenzoate tautomers, zinc thiobutyrate tautomers, cadmium thiobenzoate tautomers, zinc p-chlorothiobenzoate tautomers, aluminum thiobenzoate tautomers, thiobenzoate tautomers, zinc dithiobenzoate, zinc p-bromodithiobenzoate, zinc p-methyldithiobenzoate, zinc dithioisopentoate, cadmium dithioisobutyrate, zinc O-ethyl thiocarbonate tautomers, cadmium O-butyl thiocarbonate tautomers, zinc S-butyl dithiocarbonate tautomers, cadmium S-propyl dithiocarbonate tautomers, zinc methyl xanthate, zinc ethyl xanthate, zinc isopropyl xanthate, zinc n-butyl xanthate, zinc tetramethylene xanthate, cadmium isopropyl xanthate, cadmium allyl xanthate, ferric isopropyl xanthate, zinc ethyl trithiocarbonate, zinc butyl trithiocarbonate, zinc dimethylthiocarbamate tautomers cadmium diethylthiocarbomate tautomers, zinc dithiocarbamate, zinc methyldithiocarbamate, zinc methyl ethyldithiocarbamate, zinc dimethyldithiocarbamate, zinc N-pentamethylenedithiocarbamate, aluminum dimethyldithiocarbamate, ethylzinc dithiopropionate, ethylzinc butyl xanthate, zinc methoxy methyl xanthate, zinc n-butoxy n-butyl xanthate, zinc allyloxy methyl xanthate, ethylaluminum di(thiobenzoate), diethylaluminum thiobenzoate, etc.

Many of the catalyst compounds disclosed in this invention may be obtained from commercial sources. Others may be readily prepared by well understood techniques known to those skilled in the art. Those which cannot be secured from commercial sources or prepared by well known techniques may be obtained by the following general procedure: For instance, zinc methoxy methyl xanthate,

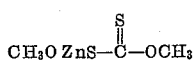

was prepared by reacting freshly prepared zinc methyl xanthate,

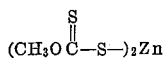

with warm methanol and filtering out the insoluble material for use as a catalyst. This insoluble material contained 30.75 percent sulfur, the calculated value being 31.4 percent. Similarly, other alcohols may be used instead of methanol to produce the corresponding zinc alkoxy methyl xanthate.

While the amount of catalyst employed in the practice of this invention is not critical, it is to be understood that a sufficient amount should be used to provide a catalytic effect. It has been found that satisfactory results are obtained by employing from $10^{-4}$ to 0.1 mols of catalyst per liter of monomer and that optimum desirable results are achieved when from $0.2 \times 10^{-2}$ to $3 \times 10^{-2}$ mols per liter are used.

*Polymerization and recovery*

In practicing this invention the reaction temperature may be varied over a wide range; for instance, from about $-50°$ to about $200°$ C., and thus is not critical. It has been found that a temperature of 0 to $100°$ C. is convenient for carrying out polymerizations.

As is well understood with reactions of this type, the reaction time generally increases with decreasing temperature, although other commonly understood factors also influence the polymerization rate. While the process may be conducted at supra-atmospheric, as well as subatmospheric pressures, such as are frequently utilized for polymerization reactions, it is an advantage of the subject invention that the process may be performed with good results either very near to or at atmospheric pressure.

The polymerization should generally be conducted in an inert ambient in accordance with conventional polymerization technique. Suitable for this purpose would be an atmosphere of any known gas, such as nitrogen, argon, helium; or a vacuum. In the instance of the zinc butyl xanthate catalyst employed in polymerizing propylene oxide, it was observed that limited amounts of oxygen could be present without any apparent adverse effect.

The polymerization process of this invention may be carried out either in bulk or in inert solvent or suspending medium. For this purpose any common aromatic, cycloaliphatic, aliphatic hydrocarbon, halogenated hydrocarbon or ether may be used; as for example, benzene, toluene, cyclohexane, heptane, hexane, pentane, chlorobenzene, carbon tetrachloride, diethyl ether, tetrahydrofuran and the like. Benzene has been found to be generally suitable for this purpose.

*Polymers*

The polyepoxides and polyepisulfides produced in the practice of the subject invention are high molecular weight polymers which may be crystalline or amorphous solids, or rubbery materials. In addition to the polymers formed by polymerizing monomers of the general type disclosed, the catalyst of the subject invention may be used to form saturated copolymers thereof as well as unsaturated, vulcanizable copolymers. Examples of the saturated copolymers would be the copolymers of ethylene oxide and propylene oxide or ethylene sulfide and propylene sulfide. A vulcanizable coploymer would result, for example, from polymerizing allyl glycidyl ether and propylene oxide monomers; or vinyl cyclohexene oxide and 1-butene oxide monomers; or cyclooctadiene monoxide and propylene oxide monomers; or by dicyclopentadiene monoxide and propylene oxide monomers. Other examples of the sulfide copolymers would result from the copolymerization of butadiene monosulfide and propylene sulfide. An example of a halo-substituted copolymer is that formed by the copolymerization of epichlorohydrin and propylene oxide. More complicated interpolymers are also envisioned as falling under the scope of this invention. For example, to control crystallinity, to improve vulcanizability or otherwise modify and improve the polymers made by this process it may be beneficial to use one or more than one saturated epoxide monomer in conjunction with one or more unsaturated epoxide monomers; e.g. the product obtained by copolymerizing ethylene oxide, propylene oxide and allyl glycidyl ether monomers; or propylene oxide, styrene oxide and allyl glycidyl ether monomers; or propylene oxide, allyl glycidyl ether and vinyl cyclohexene oxide monomers.

The elastomers produced by my invention may be compounded and processed by normal procedures known in the art. They are readily compounded with fillers such as carbon black and with antioxidants and other conventional compounding materials. The unsaturated elastomers are readily vulcanized with the aid of conventional sulfur plus accelerator vulcanizing systems appropriate for the degree of unsaturation in the elastomer.

It has also been discovered that, in addition to functioning as suitable catalysts for polymerizing epoxide and episulfide monomers, the catalyst compounds of this invention are also superior curing agents for epoxy resins. The epoxy resin-catalyst mixtures display a superior shelf life extending from several days to several months; some mixtures have existed for periods in excess of 18 months at room temperature with no evidence of any setting-up.

*Examples*

The practice of this invention is illustrated by reference to the following examples which are intended to be representative rather than restrictive of its scope. Unless stated otherwise, all polymerization reactions were conducted in a nitrogen atmosphere according to the following general procedure wherein all parts are by weight unless otherwise noted. As employed in this specification "inherent viscosity" $\{\eta\}$ is defined as the natural logarithm of the relative viscosity at $30°$ C. divided by the polymer concentration for an 0.05 to 0.10 percent (w./v.) solution in benzene containing 0.1 percent phenyl beta-naphthylamine (PBNA), and expressed in units of dl./g.

Into a clean, dry, glass bottle was added the indicated parts of dry monomer (mixture) and of dry solvent. Nitrogen was bubbled through the mixture for two minutes. The specified amount of catalyst was transferred to the mixture, nitrogen bubbled through the mixture for one minute, and the bottle tightly capped.

Thereafter the bottle was tumbled in a $50°$ C. water bath for the designated time period. Polymerization was terminated by the addition of 20 parts of methanol containing 0.2% phenyl beta-naphthylamine stabilizer. The resultant polymer was initially aspirator dried for 24 hours and subsequently dried under 2 mm. Torr for approximately 68 hours at $40°$ C. Where the polymer is insoluble in methanol, as for instance in the case of the butene oxide or styrene oxide polymers, the polymerization mixture was precipitated in excess methanol containing 0.2% phenyl beta-naphthylamine followed by the drying procedure outlined above.

*Examples 1–22*

The experimental results are shown in Table I. The copolymers of Examples 9 and 10 were compounded according to the recipe shown in Table VIII, part B. On curing at $310°$ F. for 60 minutes, substantially cured materials were obtained.

TABLE I

| Example No. | Monomer(s) | Solvent | Catalyst | Gram | Polymerization Temp., °C. | Polymerization Time, hrs. | Polymer Yield,[1] Percent | $\{\eta\}$ dl./g. |
|---|---|---|---|---|---|---|---|---|
| 1 | PO, 20 ml | n-Heptane, 40 ml | Zinc n-Butyl Xanthate | 0.40 | 25 | 64 | 63 | 2.6 |
| 2 | PO, 20 ml | Tetrahydrofuran, 40 ml | ___do___ | 0.40 | 25 | 64 | 42.5 | 2.4 |
| 3 | PO, 20 ml | Carbon Disulfide, 40 ml | ___do___ | 0.40 | 25 | 64 | 7.5 | 0.7 |
| 4 | PO, 40 ml | Chlorobenzene, 40 ml | ___do___ | 0.40 | 50 | 65 | 87.6 | 4.0 |
| 5 | PO, 40 ml | Carbon Tetrachloride, 40 ml | ___do___ | 0.40 | 50 | 65 | 86.5 | 3.8 |
| 6 | 1-Butene Oxide, 40 ml | None | ___do___ | 0.27 | 25 | 68 | 14.5 | 2.8 |
| 7 | AGE, 10 ml | ___do___ | ___do___ | 0.30 | 50 | 64 | 53.5 | 0.7 |
| 8 | 1-Octene Oxide, 34 ml | Benzene, 16 ml | ___do___ | 1.0 | 50 | 140 | 27 | 0.5 |
| 9 | PO, 100 ml.; Vinyl Cyclohexene Oxide, 10 ml | None | ___do___ | 0.80 | 50 | 16 | 40 | 3.6 |
| 10 | 1-Butene Oxide, 50 ml.; Vinyl Cyclohexene Oxide, 5 ml | ___do___ | ___do___ | 0.40 | 50 | 18.3 | 43 | 1.9 |
| 11 | PO, 40 ml | ___do___ | Zinc Methyl Xanthate | 0.186 | 50 | 16.5 | 49.5 | 2.85 |
| 12 | Styrene Oxide, 20 ml | ___do___ | Zinc Tetramethylene Xanthate | 0.40 | 85 | 16.5 | 7 |  |
| 14 | Styrene Oxide, 55 ml | ___do___ | Zinc n-Butyl Xanthate | 0.42 | 50 | 135 | 24 | 4.6 |
| 15 | PS, 10 ml | Benzene, 40 ml | Cadmium Isopropyl Xanthate | 0.10 | 0 | 23.5 | 60 | 0.9 |
| 18 | PO, 40 ml | None | {Zinc Methoxy Methyl Xanthate.[2] $CH_3OZnS-\overset{S}{\overset{\|}{C}}-OCH_3$} | 0.186 | 50 | 16.5 | 55 | 3.4 |
| 19 | 2-Octene Oxide, 20 ml | ___do___ | {Zinc Methoxy Methyl Xanthate.[2] $CH_3OZnS-\overset{S}{\overset{\|}{C}}-OCH_3$} | 0.186 | 50 | 16.5 | 1 |  |
| 20 | PO, 40 ml | Benzene, 40 ml | Zinc Isopropyl Xanthate | 0.78 | 50 | 26 | 84 | 2.1 |
| 21 | PO, 40 ml | ___do___ | Cadmium Isopropyl Xanthate | 0.89 | 50 | 112 | 37 | 0.4 |
| 22 | PO, 40 ml | ___do___ | Ferric Isopropyl Xanthate | 1.06 | 50 | 66 | 14 | 0.9 |

[1] Excludes catalyst and PBNA contributions.
[2] Prepared by reacting zinc methyl xanthate and warm methanol and filtering out the insoluble material for use as a catalyst.
PO—Propylene Oxide. PS—Propylene Sulfide. AGE—Allyl Glycidyl Ether.

*Examples 23–25*

1-butene oxide was polymerized according to the general procedure noted above, using zinc isopropyl xanthate as a catalyst. The effect of various additives to the polymerization reaction mix is shown in Table II.

TABLE II

Polymerization of 1-butene oxide with crystallized zinc isopropyl xanthate catalyst. Effect of additive during polymerization.

40 ml. butene oxide, 40 ml. benzene (mixture passed through silica gel column), catalyst, 2.32 millimols, additive, 2.32 millimols. 16.5 hours, 50° C.

| Example No. | Additive | Polymer Yield Grams | Polymer Yield Percent | $\{\eta\}$ dl./g. |
|---|---|---|---|---|
| 23 | None | 19.3 | 66 | 3.2 |
| 24 | Water | 1.1 | 3.8 | 0 |
| 25 | Sulfur | 15.7 | 53.5 | 3.27 |

Note.—1 millimol of catalyst is equivalent to 0.217 mol percent on 0.46 mol of 1-butene oxide used.

*Example 26*

Into an 8-oz. bottle flushed with nitrogen was added 10 ml. of benzene and propylene oxide solution (1:1 by volume) followed by 175 ml. of benzene and 8.1 grams of purified zinc n-butyl xanthate. The bottle was flushed with nitrogen again, capped tightly and placed in water at 20° C. The contents of the bottle were shaken periodically. The bottle was allowed to remain surrounded by water for 64 hours. Benzene solvent was removed under reduced pressure to yield 12.0 grams of a yellow, pasty mass. A 10.5 gram portion of this material was extracted with heptane to give 4.1 grams of a straw-yellow, powdery residue.

A 40 ml. portion of propylene oxide was polymerized under nitrogen for 16 hours at 50° C. with 0.2 gram of the insoluble residue. The yield of the polymers was 31.2 grams (92 percent). The polymer was quite tough and had an inherent viscosity of 2.8.

*Example 27*

A mixture of 10 ml. propylene sulfide and 40 ml. chlorobenzene was polymerized at 0° C. for 18 hours using 0.1 gram of heptane-insoluble residue of example No. 26. The reaction mass was precipitated in excess methanol solution containing 0.1 percent PBNA. The yield of the polymer was quantitative. It had an inherent viscosity of 1.0.

*Examples 28–30*

The data in Table III demonstrate the catalytic action of zinc ethyl trithiocarbonate prepared in situ. A 40 ml. portion of purified propylene oxide was bulk polymerized under nitrogen at 50° C. in each case.

TABLE III

| No. | Catalyst | Polymerization Time, hrs. | Polymer Yield, percent | $\{\eta\}$ |
|---|---|---|---|---|
| 28 | 0.3 gram zinc thioethyl (1.6 millimols). | 17 | 2 | 0.11 |
| 29 | 0.3 gram zinc thioethyl (1.6 millimols)+0.118 gram carbon disulfide (1.6 millimols). | 17 | 3 | 0.06 |
| 30 | 0.3 gram zinc thioethyl (1.6 millimols)+0.238 gram carbon disulfide (3.2 millimols). | 17 | 15 | 0.20 |

In Nos. 29 and 30, the reaction between zinc ethyl mercaptide and carbon disulfide was allowed to proceed in the 4-oz. bottle for 30 minutes in order to allow the formation of zinc ethyl trithiocarbonate. Afterwards, propylene oxide was added.

*Example 31*

Zinc n-butyl xanthate, 2 grams, was dissolved in 100 ml. n-butyl alcohol and the solution kept at 110° C. for 2½ hours. After cooling, the residue was filtered, washed with heptane and dried under 2 mm. torr to yield 1.2 grams of a straw-yellow powdery material.

A 50 ml. portion of propylene oxide was polymerized at 50° C. for 39 hours with 0.46 gram of the powdery material isolated above. The yield of the polymer was 35.6 grams. It had an inherent viscosity of 6.6.

*Examples 32–40*

The data in Table IV demonstrate that dithiocarbamates of zinc and cadmium also catalyze the polymerization of olefin oxides and propylene sulfide.

mediate change of color to light brown. The catalyst was allowed to age for 7 weeks at the room temperature. The molar ratio of carbon disulfide to diethylzinc in this catalyst was 1.08:1. Similarly, catalyst B and catalyst C having carbon disulfide to diethylzinc molar ratios of 2.16:1 and 2.8:1, respectively were prepared and aged for 7 weeks. These catalysts were used for polymerizing propylene oxide. A 2 ml. portion from each of these catalysts was used for polymerizing 40 ml. of propylene oxide at 50° C. for 17½ hours. The data are shown in Table VI:

TABLE VI

| Example | Catalyst | Percent Polymer Yields [1] | {η} |
|---|---|---|---|
| 49 | A | 94 | 3.7 |
| 50 | B | 92 | 3.0 |
| 51 | C | 80 | 2.0 |

[1] Includes catalyst residue.

TABLE IV

| Example No. | Monomer(s) | Solvent | Catalyst | Gram | Polymerization Temp., °C. | Polymerization Time, hrs. | Polymer Yield,[1] Percent | {η} dl./g. |
|---|---|---|---|---|---|---|---|---|
| 32 | PO, 40 ml | None | Zinc Dimethyldithiocarbamate. | 0.488 | 50 | 88 | 96 | 4.0 |
| 33 | PO, 40 ml | do | Zinc Pentamethylenedithiocarbamate. | 0.619 | 50 | 88 | 81 | 3.2 |
| 34 | PO, 40 ml | do | Zinc Dibenzyldithiocarbamate. | 0.974 | 50 | 64 | 3 | 0.35 |
| 35 | PO, 35 ml | Diethyl Ether, 35 ml | Zinc Dimethyldithiocarbamate. | 0.40 | 50 | 64 | 0.5 | 0.4 |
| 36 | Ethylene Oxide, 17.6 grams | Benzene, 55 ml | do | 0.40 | 50 | 64 | 3.5 | 0.4 |
| 37 | Epichlorohydrin, 25 ml | do | do | 0.40 | 50 | 64 | 1 | 0.5 |
| 38 | PS, 10 ml | Benzene, 40 ml | do | 0.488 | 30 | 88 | 64 | 0.26 |
| 39 | PS, 10 ml | do | Cadmium Dimethyldithiocarbamate. | 0.40 | 50 | 90 | 96 | 0.3 |
| 40 | PO, 50 ml | None | Cadmium Pentamethylenedithiocarbamate. | 0.615 | 50 | 40 | 8.2 | 2.5 |

[1] Excludes catalyst and PBNA contributions.

*Examples 41–48*

The data in Table V show that zinc and cadmium salts of mono- and dithiocarboxylates catalyze the polymerization of propylene oxide, 2-octene oxide, and propylene sulfide. The copolymer in Example 42 was compounded according to the recipe shown in Table VIII, part B. On curing at 300° F. for 60 minutes, a crosslinked product was obtained.

The data show that salts of dithiopropionic acid are effective catalysts. The mixture in Example 49 was essentially solid after 2 hours. The contents of Examples 50 and 51 were quite viscous.

TABLE V

| Example No. | Monomer(s) | Solvent | Catalyst | Gram | Polymerization Temp., °C. | Polymerization Time, hrs. | Polymer Yield,[1] Percent | {η} dl./g. |
|---|---|---|---|---|---|---|---|---|
| 41 | PO, 40 ml | None | Zinc Thiobenzoate | 0.49 | 50 | 24 | 65 | 3.6 |
| 42 | PO, 50 ml.; AGE, 5 ml | do | do | 0.545 | 30 | 68 | 27 | 2.8 |
| 43 | PO, 40 ml | do | Zinc Benzoate | 0.39 | 50 | 116 | 0.7 | 0.09 |
| 44 | PO, 40 ml | do | Cadmium Thiobenzoate. | 0.617 | 50 | 67 | 94 | 1.34 |
| 45 | PS, 25 ml | do | Zinc Thiobenzoate | 0.34 | −30 to −20 | 68 / 192 | 92 | 0.64 |
| 46 | PS, 10 ml | Benzene, 40 ml | do | 0.545 | 30 | 16 | 97 | 0.5 |
| 47 | PO, 50 ml | None | Zinc Dithioisopentoate | 0.532 | 50 | 48 | 12.5 | 5.8 |
| 48 | 2-Octene Oxide, 20 ml | do | Zinc Thiobenzoate | 0.54 | 50 | 137 | 6 | 0.2 |

[1] Excludes catalyst and PBNA contributions.

*Examples 49–51*

Catalyst A was prepared by injecting 1.38 ml. of carbon disulfide through a self-sealing gasket fitted on a 4-oz. bottle, flushed with nitrogen and containing 10 ml. of 2.1 molar diethylzinc solution in benzene. There was an im-

*Examples 52–53*

Zinc n-butyl xanthate catalyst was employed to prepare a vulcanizable copolymer of allyl glycidyl ether with propylene oxide and with 1-butene oxide. The copolymerization data together with the vulcanization recipe and physical properties of the vulcanizate are shown in Table VII where propylene oxide was employed and in Table VIII where 1-butene oxide was employed.

TABLE VII

*Example 52.—Copolymer of propylene oxide and allyl glycidyl ether (AGE) and its vulcanization*

A. Copolymerization:

| | | |
|---|---|---|
| Benzene | ml | 950 |
| Propylene oxide [1] | do | 400 |
| AGE [1] | do | 25 |
| ZIX [2] (crude) (Catalyst/Monomer ratio=1:126) | grams | 15.6 |
| Polymerization Temp., °C. | | 50 |
| Polymerization Time, hours | | 90 |
| Yield (89.5%) | g | 320 |
| Inherent viscosity | dl./g | 1.4 |

[1] Molar charge ratio=96.5 : 3.5.

B. Vulcanization recipe:

| | Parts by weight |
|---|---|
| Rubber | 100 |
| Zinc oxide | 5 |
| Stearic acid | 3 |
| Sulfur | 2 |
| Methyl tuads | 1 |

Cure: 60'/310° F.

C. Stress-strain properties:

| | |
|---|---|
| Tensile strength, p.s.i. | 1075 |
| Elongation-at-break, percent | 810 |
| Modulus (300%), p.s.i. | 126 |

[2] Zinc isopropyl xanthate.

TABLE VIII

*Example 53.—Copolymer of 1-butene oxide and allyl glycidyl ether (AGE) and its vulcanization*

A. Copolymerization:

| | | |
|---|---|---|
| Benzene | ml | 910 |
| 1-Butene oxide [1] | do | 455 |
| AGE [1] | do | 30 |
| ZIX (crude) (Catalyst/Monomer ratio=1:117) | grams | 15.6 |
| Polymerization Temp., °C. | | 50 |
| Polymerization Time, hours | | 67 |
| Yield (53%) | g | 220 |
| Inherent viscosity | dl./g | 2.1 |

B. Vulcanization recipe:

| | Parts by weight |
|---|---|
| Rubber | 100 |
| SAF black | 50 |
| Zinc oxide | 5 |
| Stearic acid | 3 |
| Sulfur | 2 |
| Methyl tuads | 1 |
| Tellurac | 0.5 |

Cure: 60'/310° F.

C. Stress-strain properties:

| | |
|---|---|
| Tensile strength, p.s.i. | 1455 |
| Elongation-at-break, percent | 340 |
| Modulus 100%, p.s.i. | 430 |
| Modulus 300%, p.s.i. | 1310 |

[1] Molar charge ratio=95.43 : 4.57.

Example 54 octene oxide and 8 ml. allyl glycidyl ether was polymerized at 50° C. under nitrogen using 0.4 gram of zinc n-butyl xanthate catalyst. The time of polymerization was 45 hours. The polymerization was terminated with 150 ml. of methanol containing 0.45 g. of PBNA stabilizer. The yield of the copolymer was 61.3 grams. It had an inherent viscosity of 4.8.

The copolymer was compounded according to the recipe in Table VIII, part B and cured at 60'/295° F. The vulcanizate was a highly resilient material. It had a swelling ratio of 7.25 and 8.1 percent solubility in benzene.

Example 55

A seeded catalyst was prepared under nitrogen by reacting 200 ml. of propylene oxide-benzene solution (1:15 by volume) with 8.1 grams of purified zinc n-butyl xanthate for 64 hours. The temperature of the reaction was kept below 40° C. A 14.4 ml. portion of the reaction solution was used for polymerizing a mixture of 50 ml. propylene oxide and 5 ml. allyl glycidyl ether at 30° C. After 65 hours, 33.7 grams of a copolymer having inherent viscosity of 3.9 was obtained. This copolymer was compounded according to the recipe shown in Table VIII, part B, and cured at 300° F. for 60 minutes. The vulcanizate had a swelling ratio of 5.9 and 9.2 percent solubility in benzene.

Example 57

To a suspension of 1.66 grams of zinc methoxide, $Zn(OCH_3)_2$, in 50 ml. of methanol in a 4-oz. bottle was added 30 ml. of carbon disulfide solution. The bottle was capped and the contents were allowed to remain together for 20 hours at the room temperature. The reaction mixture was dried under reduced pressure to yield an almost white powder (B). It contained 14.6 percent sulfur. A 40 ml. portion of propylene oxide was polymerized at 50° C. for 88 hours using 0.63 gram of B. The yield of the polymer was 30.2 grams. It had an inherent viscosity of 1.9. However, when 0.63 gram of zinc methoxide was used as a catalyst under otherwise identical conditions, the yield of the polymer was 5.9 grams and the inherent viscosity was 1.2.

Example 58

A solution of 0.48 gram of n-butyldixanthogen, $(n-C_4H_9OCSS)_2$ in 40 ml. propylene oxide was reacted under nitrogen with 0.85 ml. of 1.9 molar diethylzinc solution in heptane. The molar ratio of the dixanthogen to diethylzinc was 1.0. Polymerization at 50° C. gave a polymeric material having an inherent viscosity of 2.0.

Examples 59–63

Into a nitrogen-flushed 4-oz. bottle fitted with a serum cap was injected 10 ml. of 0.64 molar triisobutylaluminum solution in benzene, followed by 0.385 ml. of carbon disulfide. The molar ratio of carbon disulfide to triisobutylaluminum was 1:1. Similarly, catalysts were prepared by injecting 0.77, 1.155, and 1.54 ml. of carbon disulfide to 10 ml. each of the triisobutylaluminum solution so that the molar ratio of $(i-Bu)_3Al$ to $CS_2$ was 2:1, 3:1 and 4:1, respectively. The catalysts were allowed to age at 25° C. for 96 hours. A 40 ml. portion of propylene oxide, freshly distilled over calcium hydride, was polymerized at 50° C. under nitrogen using 5.0 millimoles of each of the above catalysts. The time of polymerization was 17 hours. A control experiment using 5.0 millimoles of the triisobutylaluminum solution only was performed in an analogous manner. The data are given in Table IX.

TABLE IX

| Example Number | $CS_2/(i-Bu)_3Al$ Molar Ratio | Polymer Yield,[1] Percent | Inherent Viscosity |
|---|---|---|---|
| 59 | 0 | [2] 42 | 0.15 |
| 60 | 1 | 71.6 | 0.19 |
| 61 | 2 | 67.4 | 0.13 |
| 62 | 3 | 71.3 | 0.16 |
| 63 | 4 | 70.3 | 0.15 |

[1] Includes catalyst residue contribution.
[2] Reaction mixture became hot on adding the catalyst to the monomer These data demonstrate that aluminum salts of dithioisopentoate, prepared in situ, give considerably enhanced yield of polymer over the value in the control experiment.

Example 64

A 40 ml. portion of propylene oxide was polymerized at 50° C. under nitrogen for 24 hours using 0.50 gram of zinc monomethyldithiocarbamate. Polymerization was terminated with 50 ml. methanol containing 0.3 gram PBNA. The total yield of polymer, including catalyst residue and PBNA, was 6.6 grams. It had an inherent viscosity of 1.7.

*Examples 65–67*

Epoxy resin and curative mixtures were prepared in ointment cans, flushed with nitrogen and placed in a heated oven for various time intervals. The data are shown in Table X.

TABLE X

| Example No. | Epoxy Resin | Curing Agent | Oven Temp., °C. | Curing Time, hrs. | Swelling Ratio [1] | Percent [1] Sol. |
|---|---|---|---|---|---|---|
| 65 | Epon 828,[2] 10 grams | Zinc n-butyl xanthate, 0.4 gram. | 120 | 72 | ~1.0 | Nil |
| 66 | ____do____ | Zinc dimethyl-dithio-carbamate, 0.4 gram. | 140 | 48 | 1.5 | Nil |
| 67 | DER-332 [3] | Zinc thiobenzoate, 0.4 gram. | 140 | 288 | | 1 |

[1] Swelling ratio and percent sol. on the cured resin samples were measured in ethylene dichloride.
[2] Epon 828: Product of Shell Chemical Co., and is believed to be bisphenol A-type epoxy resin. It has an epoxide equivalent of 180–195 and viscosity of 100–160 poises at 25° C.
[3] DER-332: Product of the Dow Chemical Co. Diglycidyl ether of bisphenol A is the chemical structure approximating DER-332. It has an epoxide equivalent of 179 and a maximum viscosity of 64 poises at 25° C.

These data show that epoxy resins can be cured effectively by the various curing agent shown in the above table. A particularly noteworthy and practically useful feature of these curing systems is the long shelf life or pot life of the resin-curing agent mixture at the room temperature. For instance, the mixture in Example 65 did not set up even after 18 months.

Epoxy resins are used in a wide cross section of industries in a variety of applications such as coatings, plastic tooling, potting and encapsulating, adhesives, laminates, etc. They are available commercially under different names such as Araldite, Bakelite, Epon, Epiphen, DER, etc. They are produced in varying molecular weights. All varieties of polyhydric phenol, polyalcohols, polyfunctional halohydrins, and polyepoxides have been suggested as intermediates for epoxy resin synthesis in the patent literature. Besides the diglycidyl ether of bisphenol A (and its homologs), glycidyl ethers of glycerol, glycidyl ethers of bisphenol F, glycidyl ethers of a long-chain bisphenol, and epoxylated novolacs are of commercial significance. Epoxy resins may be cured with the air of amines, acids, acid anhydrides, alcohols and phenols. The synthesis, characterization and curing of epoxy resins are described in "Epoxy Resins, Their Applications and Technology" by Henry Lee and Kris Neville, McGraw-Hill Book Co., Inc., published in 1957 and "Epoxy Resins" by Irving Skeist, Reinhold Publishing Corp., published in 1958.

While certain representative embodiments and details have been shown for the purpose of illustrating the invention, it will be apparent to those skilled in this art that various changes and modifications may be made therein without departing from the spirit or scope of the invention.

What is claimed is:
1. The polymerization process which consists of:
 (I) Polymerizing at least one monomer with the formula

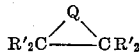

wherein
 (A) Q represents a member selected from the group consisting of oxygen and sulfur;
 (B) R' represents a member selected from the group consisting of R and hydrogen;
 (C) R represents a monovalent organic radical containing no element other than carbon, hydrogen, ether oxygen, and halogen, and containing up to 10 carbon atoms;

(II) in the presence of catalytic amount of a catalyst represented by the formula

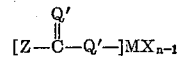

wherein
 (A) Z represents a member selected from the group consisting of organic radicals represented by R, OR, SR, and NR'$_2$;
 (B) N represents nitrogen;
 (C) S represents sulfur;
 (D) O represents oxygen;
 (E) Q' represents a member selected from the group consisting of oxygen and sulfur wherein at least one Q' must be sulfur;
 (F) M represents a member selected from the group consisting of zinc, cadmium, aluminum, and iron;
 (G) X represents any monovalent radical selected from the group consisting of halide, hydroxyl, hydride, alkoxy, thioalkyl, hydrocarbon radical, and

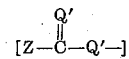

and is joined to the metal atom;
 (H) n represents the valence of the metal M;
 (I) R' and R represent the substances indicated in I (B) and (C) supra.

2. The method according to claim 1 wherein X represents the radical

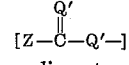

3. The method according to claim 1 wherein the monomer of I consists of: at least one member of the group consisting of 1,2-alkylene oxides containing up to 12 carbon atoms per molecule and 1,2-alkylene sulfides containing up to 12 carbon atoms per molecule.

4. The method according to claim 1 wherein Z represents a member selected from the group consisting of alkyl and aryl radicals containing up to 10 carbon atoms and wherein one Q' in the radical

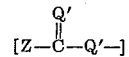

represents sulfur and the other Q' represents oxygen.

5. The method according to claim 1 wherein Z represents a member selected from the group consisting of alkoxy and thioalkyl containing up to 10 carbon atoms, and wherein one Q' in the radical

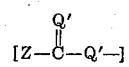

represents sulfur and the other Q' represents oxygen.

6. The method according to claim 1 wherein Z represents an amino group (NR'$_2$) and wherein one Q' in the radical

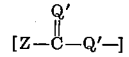

represents sulfur and the other Q' represents oxygen.

7. The method according to claim 1 wherein Z represents a member selected from the group consisting of alkyl and aryl radicals containing up to 10 carbon atoms and wherein Q' represents sulfur.

8. The method according to claim 1 wherein Z represents a member selected from the group consisting of alkoxy and thioalkyl radicals containing up to 10 carbon atoms, and wherein Q' represents sulfur.

9. The method according to claim 1 wherein Z represents an amino radical (NR'$_2$) and wherein Q' represents sulfur.

10. The method according to claim 4 wherein X represents the radical

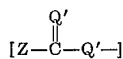

11. The method according to claim 5 wherein X represents the radical

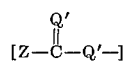

12. The method according to claim 6 wherein X represents the radical

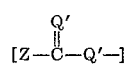

13. The method according to claim 7 wherein X represents the radical

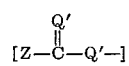

14. The method according to claim 8 wherein X represents the radical

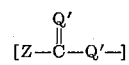

15. The method according to claim 9 wherein X represents the radical

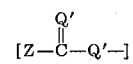

16. The method according to claim 1 wherein the monomer of I is at least one 1,2-alkylene oxide containing up to 12 carbon atoms and the catalyst of II is zinc n-butyl xanthate.

17. The method according to claim 1 wherein the monomer of I is at least one 1,2-alkylene oxide containing up to 12 carbon atoms and the catalyst of II is zinc thiobenzoate.

18. The method according to claim 1 wherein the monomer of I is at least one 1,2-alkylene sulfide containing up to 12 carbon atoms or one 1,2-alkylene oxide containing up to 12 carbon atoms and the catalyst of II is zinc dimethyldithiocarbamate.

19. The method according to claim 1 wherein the monomer of I is at least one 1,2-alkylene oxide containing up to 12 carbon atoms and the catalyst of II is a seeded catalyst consisting of the heptane insoluble fraction of the product resulting from mixing in the ratio of 1 to 8 moles of a member selected from the group consisting of 1,2-alkylene oxides, 1,2-epoxy-3-alkenyloxy propane, 1,2-alkylene sulfides and 1,2-epithio-3-alkenyloxy propane, to one mol of zinc n-butyl xanthate in the presence of an inert solvent.

20. The process according to claim 1 wherein the monomer of I consists of at least one member of the group consisting of 1,2-alkylene oxides containing up to 12 carbon atoms per molecule and 1,2-alkylene sulfides containing up to 12 carbon atoms per molecule, and up to 10 mol percent of allyl glycidyl ether.

21. A process for curing materials having a plurality of epoxy groups which consists of heating said material in the presence of at least a catalytic amount of a curing agent represented by the formula

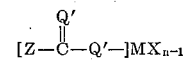

wherein
(A) Z represents a member selected from the group consisting of organic radicals represented by R, OR, SR, and NR'$_2$;
(B) N represents nitrogen
(C) S represents sulfur
(D) O represents oxygen
(E) Q' represents a member selected from the group consisting of oxygen and sulfur wherein at least one Q' must be sulfur
(F) M represents a member selected from the group consisting of zinc, cadmium, magnesium, aluminum, and iron
(G) X represents any monovalent radical selected from the group consisting of halide, hydroxyl, hydride, alkoxy, thioalkyl, hydrocarbon radical, and

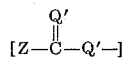

and is joined to the metal atom.
(H) $n$ represents the valence of the metal M
(I) R' represents a member selected from the group consisting of R and hydrogen; and
(J) R represents a monovalent organic radical containing no element other than carbon, hydrogen, ether oxygen, and halogen.

References Cited

UNITED STATES PATENTS

| | | | |
|---|---|---|---|
| 2,718,536 | 9/1955 | Jones | 260—793 |
| 3,026,305 | 3/1962 | Robinson | 260—2 |

WILLIAM H. SHORT, *Primary Examiner.*

T. E. PERTILLA, *Assistant Examiner.*

UNITED STATES PATENT OFFICE
CERTIFICATE OF CORRECTION

Patent No. 3,345,308                           October 3, 1967

Joginder Lal

It is hereby certified that error appears in the above numbered patent requiring correction and that the said Letters Patent should read as corrected below.

Column 1, line 62, for "ether," read -- ether --; column 2 line 5, for "OR" read -- QR --; line 11, for "halide;" read -- halide, --; line 39, for "exoranes" read -- oxiranes --; lines 41 and 42, for "1-hexane oxide, 1-octane oxide, 2-octane oxide" read -- 1-hexene oxide, 1-octene oxide, 2-octene oxide --; column 3, lines 16 and 17, for that portion of the formula reading $$\overset{Q}{\underset{\|}{\phantom{Q}}} \quad \text{read} \quad \overset{Q'}{\underset{\|}{\phantom{Q}}}$$

line 24, for the indistinct word read -- hydrocarbon --; same column 3, lines 26 to 28, for that portion of the formula reading $$\overset{O}{\underset{\|}{\phantom{O}}} \quad \text{read} \quad \overset{Q'}{\underset{\|}{\phantom{Q}}}$$

column 4, lines 22 to 26, for that portion of the formula reading $$R\diagdown \quad \text{read} \quad R'\diagdown$$

line 38, for "combination" read -- combinations --; line 47, after "tautomers," insert -- ferric --; same column 4, line 58, for "tautomers" read -- tautomers, --; column 5, line 51, before "inert" insert -- an --; columns 7 and 8, TABLE I, fourth column line 1 thereof, for "n-Butyl," read -- n-Butyl --; same table, eighth column, line 3 thereof, for "7.5" read -- 7.6 --; same table, eighth column, line 4 thereof, for "87.6" read -- 87.5 --; column 8, lines 74 and 75, for "ethyl mercaptide" read -- thioethyl --; column 11, line 65, for "octene" read -- A mixture of 100 ml. propylene oxide, 25 ml. 1-octene --.

Signed and sealed this 5th day of November 1968.

(SEAL)
Attest:

EDWARD M. FLETCHER, JR.                      EDWARD J. BRENNER
Attesting Officer                              Commissioner of Patents